(12) United States Patent
Li et al.

(10) Patent No.: US 10,534,397 B2
(45) Date of Patent: Jan. 14, 2020

(54) DISPLAY PANEL, DISPLAY DEVICE AND METHOD FOR DRIVING DISPLAY PANEL

(71) Applicant: BOE Technology Group Co., Ltd., Beijing (CN)

(72) Inventors: Xiaolong Li, Beijing (CN); Tieshi Wang, Beijing (CN); Zhiqiang Xu, Beijing (CN); Wei Qin, Beijing (CN); Kuanjun Peng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/814,604

(22) Filed: Nov. 16, 2017

(65) Prior Publication Data

US 2018/0307276 A1 Oct. 25, 2018

(30) Foreign Application Priority Data

Apr. 25, 2017 (CN) .......................... 2017 1 0284576

(51) Int. Cl.
  *G06F 1/16* (2006.01)
  *G06F 3/14* (2006.01)
  *G02B 27/01* (2006.01)
  *G06F 3/147* (2006.01)

(52) U.S. Cl.
  CPC ......... *G06F 1/1637* (2013.01); *G02B 27/017* (2013.01); *G06F 1/163* (2013.01); *G06F 3/147* (2013.01); *G06F 3/1407* (2013.01)

(58) Field of Classification Search
  CPC .... G06F 1/1637; G06F 3/1407; G02B 27/017
  See application file for complete search history.

(56) References Cited

U.S. PATENT DOCUMENTS

| | | | |
|---|---|---|---|
| 6,813,085 B2 * | 11/2004 | Richards | G02B 27/017 345/8 |
| 8,502,898 B2 | 8/2013 | Silverstein | |
| 8,947,570 B2 | 2/2015 | Silverstein | |
| 9,241,141 B1 * | 1/2016 | Chang | H04N 7/183 |
| 2003/0117545 A1 | 6/2003 | Coker et al. | |
| 2008/0259194 A1 | 10/2008 | Silverstein | |
| 2009/0278977 A1 | 11/2009 | Li | |
| 2013/0329099 A1 | 12/2013 | Silverstein | |

(Continued)

FOREIGN PATENT DOCUMENTS

| | | |
|---|---|---|
| CN | 1413315 A | 4/2003 |
| CN | 101663884 A | 3/2010 |

(Continued)

OTHER PUBLICATIONS

First Office Action, including Search Report, for Chinese Patent Application No. 201710284576.9, dated Oct. 12, 2018, 13 pages.

(Continued)

*Primary Examiner* — Charles V Hicks
(74) *Attorney, Agent, or Firm* — Westman, Champlin & Koehler, P.A.

(57) ABSTRACT

Embodiments of the disclosure provide a display panel, a display device and a method for driving the display panel. The display panel includes a substrate and a pixel array disposed on the substrate and comprising M*N pixel units, wherein the M*N pixel units are arranged in a barrel or a pillow-like arrangement, and wherein M and N are positive integers.

11 Claims, 7 Drawing Sheets

(56) References Cited

U.S. PATENT DOCUMENTS

2017/0026599 A1    1/2017  He et al.
2017/0092176 A1    3/2017  Liu et al.
2017/0206689 A1*   7/2017  Eo .......................... G06T 3/4007

FOREIGN PATENT DOCUMENTS

| CN | 104777617 A  | 7/2015  |
| CN | 105118420 A  | 12/2015 |
| CN | 105245765 A  | 1/2016  |
| CN | 105791714 A  | 7/2016  |
| CN | 106094200 A  | 11/2016 |
| CN | 106873162 A  | 6/2017  |
| JP | H11-331628 A | 11/1999 |
| JP | 2001-166381 A | 6/2001 |

OTHER PUBLICATIONS

Second Office Action, including Search Report, for Chinese Patent Application No. 201710284576.9, dated Jun. 21, 2019, 16 pages.

* cited by examiner grid structure of a normal image grid structure of an image distorted in a pillow-like form lens

DISPLAY PANEL, DISPLAY DEVICE AND METHOD FOR DRIVING DISPLAY PANEL

CROSS-REFERENCE TO RELATED APPLICATION

This application claims the benefit of Chinese Patent Application No. 201710284576.9 filed on Apr. 25, 2017 in the State Intellectual Property Office of China, the whole disclosure of which is incorporated herein by reference.

BACKGROUND OF THE INVENTION

Embodiments of the disclosure relate to field of virtual reality technology, and in particular, to a display panel, a display device, and a method for driving the display panel.

DESCRIPTION OF THE RELATED ART

An image viewed by a user through a VR device is distorted due to the design of an optical path of the VR device, which may affect the user's visual experience. Conventional VR devices mainly use relevant image processing algorithms to correct the distortion, which however, would result in degrade the image clarity and increase of the power consumption and computational complexity of the VR device.

SUMMARY OF THE INVENTION

Therefore, the disclosure proposes a display panel, a display device and a method for driving the display panel.

According to an aspect of the disclosure, there is provided a display panel comprising a substrate; and a pixel array disposed on the substrate and comprising M*N pixel units, wherein the M*N pixel units are in a barrel or a pillow-like arrangement, and wherein M and N are positive integers.

Optionally, the M*N pixel units form the barrel or pillow-like arrangement through a transformation according to following formula:

$$x_u = x_d(1+kx_d^2)$$

$$y_u = y_d(1+ky_d^2),$$

wherein $x_u$ and $y_u$ are coordinates of the pixel units with respect to a central pixel unit when the pixel units are uniformly distributed in abscissa and ordinate directions before the transformation, $x_d$ and $y_d$ are coordinates of the pixel units respect to the central pixel unit in the abscissa and ordinate directions after the transformation, and k is a distortion factor.

Optionally, pixel sizes of the plurality of pixel units after the transformation are determined by the following formula:

$$p_u = p_d(1+3kr_d^2),$$

wherein $r_d^2 = x_d^2 + y_d^2$, $p_u$ is the pixel sizes of the transformed pixel units when the pixel units are uniformly distributed in the abscissa and ordinate directions before the transformation, $p_d$ is the pixel sizes of the pixel units after the transformation, and k is the distortion factor.

According to another aspect of the disclosure, there is provided a display device comprising: the display panel according to claim 1; and a lens disposed on the display panel.

Optionally, the lens is a convex lens, and the M*N pixel units on the display panel are in the barrel arrangement.

Optionally, the lens is a concave lens, and the M*N pixel units on the display panel are arranged in the pillow-like arrangement.

Optionally the distortion factor k is determined based on a focal length of the lens.

According to yet another aspect of the disclosure, there is provided a method for driving the display panel according to claim 1, comprising steps of: obtaining a standard pixel brightness of the pixel units when the pixel units are uniformly distributed in abscissa and ordinate directions before the transformation; generating a pixel brightness of the M*N pixel units based on the standard pixel brightness after the transformation; and controlling a driving voltage or current of the M*N pixel units based on the pixel brightness of the pixel units after the transformation.

Optionally, the pixel brightness of the M*N pixel units after the transformation is generated by the following formula:

$$L_u = L_d(1+3kr_d^2)^2,$$

wherein $r_d^2 = x_d^2 + y_d^2$, $x_d$ and $y_d$ are coordinates of the pixel units with respect to the central pixel unit in the abscissa and ordinate directions before the transformation, $L_u$ is the standard pixel brightness of the pixel units before the transformation, $L_d$ is the pixel brightness of the pixel units after the transformation, and k is the distortion factor.

Optionally, the M*N pixel units are configured such that the projections of the pixel units through a lens are uniformly distributed.

Additional aspects and advantages of the disclosure will be set forth partially in the following description and will be partially apparent from the following description or understood from the practice of the disclosure.

BRIEF DESCRIPTION OF THE DRAWINGS

The foregoing and/or additional aspects and advantages of the disclosure will become apparent and readily conceivable from the following description of the embodiments, taken in conjunction with the accompanying drawings, in which.

DETAILED DESCRIPTION OF PREFERRED EMBODIMENTS OF THE INVENTION

The embodiments of the disclosure are described in detail below, and examples of the embodiments are shown in the accompanying drawings, wherein the same or similar reference signs denote same or similar elements or components having same or similar functions throughout the context. The embodiments described below with reference to the accompanying drawings are exemplary and are intended to explain the disclosure, rather than being construed as limiting to the disclosure.

A display panel, a display device and a method for driving the display panel according to the embodiments of the present disclosure are described with reference to the accompanying drawings below.

Figure 1:
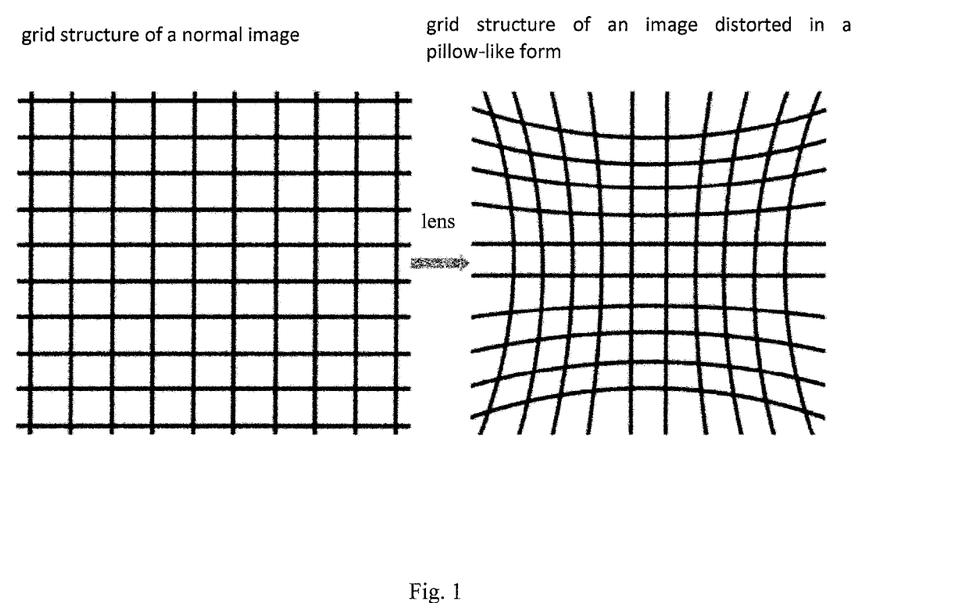
FIG. 1 is a schematic diagram of a pillow-like distortion of a grid structure of a normal image when being observed through a convex lens.
Figure 2:
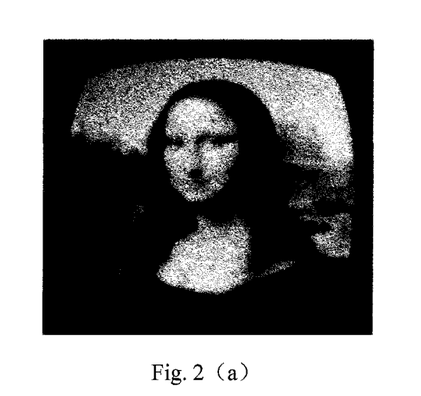
FIG. 2(a) is a normal image.
FIG. 2(b) is a pillow-like distorted image of a planar image when being observed through the convex lens.
FIG. 2(c) is a pillow-like distorted image of a planar image when being observed through the convex lens with a smaller focal length.

With the development of Internet technology, VR devices are also getting more advanced, from original VR glasses to the later VR all-in-one machine, and then to today's VR helmet. However, no matter what kind of VR devices, they are inseparable from a lens as the most basic configuration. Due to its own characteristics, the lens would cause a normal image to be more or less distorted, and the distortion degree is gradually increased from a center of the vision field to an edge of the vision field. The most intuitive feeling to the distortion is that a straight line at the center of vision field is bent after extending to the edge of the vision field, and a user tends to feel dizzy after watching the distorted images for long time. Taking a convex lens as an example, FIG. 1 is a schematic diagram of a pillow-like distortion of a grid structure of a normal image when being observed through a convex lens. FIG. 2(a) is a normal image, FIG. 2(b) is a pillow-like distorted image of a planar image when being observed through the convex lens, FIG. 2(c) is a pillow-like distorted image of a planar image when being observed through the convex lens with a smaller focal length. It can be seen from FIG. 1 that, the pillow-like distorted grid is depressed from a periphery to a center of the grid. It can be seen from FIGS. 2(b) and 2(c) that, the pillow-like distorted image is stretched, and the smaller the focal length of the convex lens, the more serious the image distortion.

In order to correct the image distortion, a conventional method is to transform each frame of image through relevant image processing algorithms in real time, and the image after the transformation may be normally displayed through the lens. However, it would consume many computing resources when current method is used to correct the image distortion, thereby increasing power consumption and computational complexity of VR devices.

In view of the above problems, embodiments of the disclosure propose a display panel capable of correcting the image distortion without increasing power consumption and cost, thereby improving image quality.

Figure 3:
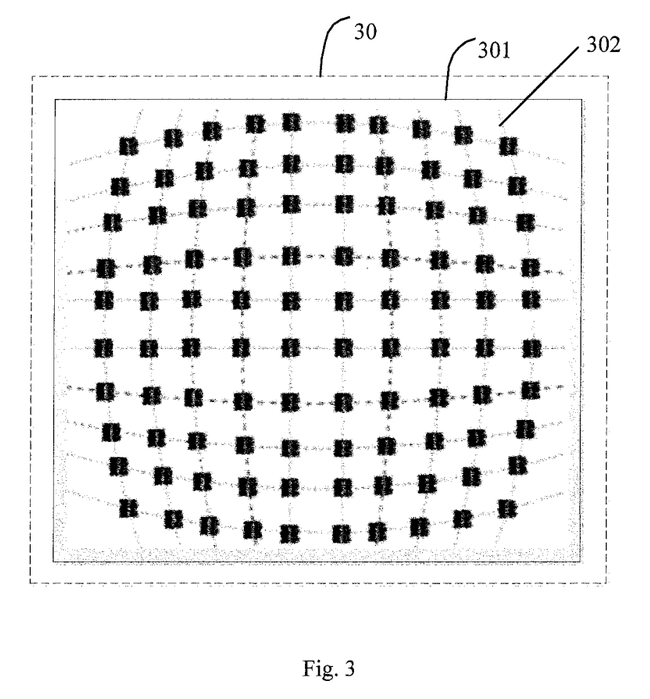
FIG. 3 is a schematic structural view of a display panel according to an embodiment of the disclosure.

FIG. 3 is a schematic structural view of a display panel according to an embodiment of the disclosure.

As shown in FIG. 3, the display panel 30 comprises a substrate 301 and a pixel array 302 disposed on the substrate 301 and including M*N pixel units, and the M*N pixel units are in a barrel or a pillow-like arrangement, and M and N are positive integers.

It should be noted that, since the display panel may be combined with a lens to form a display device, the distribution of pixel units in the pixel array on the display panel of the embodiment of the disclosure may be different due to different types of the lens.

As an example, when the lens is a convex lens, the M*N pixel units on the display panel of the embodiment of the disclosure may be in a barrel arrangement, i.e., the M*N pixel units are arranged in a barrel form. The barrel arrangement may be understood that the image presented by the pixel array is a barrel distortion image when one frame of image is loaded to the pixel array in the barrel arrangement. In the pixel array 302, each pixel unit is bulged from a center to a periphery of the pixel array so that the pixel array of the M*N pixel units is in the barrel form. Generally, the normal image would be pillow-likely distorted after passing through a convex lens, and the pillow-like distorted image is depressed from the periphery to the center of the pixel array, as shown in FIG. 1. In order to counteract the pillow-like distortion of the image after passing through the convex lens, the M*N pixel units are arranged in the barrel form (which may be understood as an inverse distortion of the pillow-like distortion). In this way, with the convex lens being disposed on the improved display panel 30, it is possible to eliminate the pillow-like distortion of the image when passing through the convex lens, so that the image after passing through the convex lens is normally displayed, thereby reducing the influence of the convex lens on the image. For the sake of easy understanding, FIG. 3 is an exemplary structural view of the display panel 30 taking the convex lens as an example.

As another example, when the lens is a concave lens, the M*N pixel units on the display panel according to the embodiment of the disclosure may be in a pillow-like arrangement, i.e., the M*N pixel units are arranged in a pillow-like form. The pillow-like arrangement may be understood that, the image presented by the pixel array is a pillow-like distortion image when one frame of image is loaded to the pixel array in the pillow-like arrangement. In the pixel array, each pixel unit is depressed from the periphery to the center of the pixel array so that the pixel array composed of the M*N pixel units is in the pillow-like form. Generally, the normal image would be barrel distorted after passing through the concave lens, and the barrel distorted image is bulged from the center to the periphery of the pixel array. In order to counteract the barrel distortion of the image passing through the concave lens, the M*N pixel units are arranged in the pillow-like form (which may be understood as an inverse distortion of the barrel distortion). In this way, with the concave lens being disposed on the improved display panel 30, it is possible to eliminate the barrel distortion of the image when passing through the concave lens, so that the image after passing through the concave lens is normally displayed, thereby reducing the influence of the concave lens on the image.

Alternatively, in an exemplary implementation of the embodiment of the disclosure, for an arrangement of the M*N pixel units in the pixel array, a coordinate of each pixel unit with respect to a central pixel unit may be obtained by calculating according to the following formula (1), and then the pixel units in the pixel array may be rearranged according to the coordinates of the calculated pixel units so that the M*N pixel units are arranged in the barrel or pillow-like form. As an example, the M*N pixel units may be arranged in the barrel or pillow-like form according to the following formula (1):

$$x_u = x_d(1+kx_d^2)$$

$$y_u = y_d(1+ky_d^2) \qquad (1)$$

wherein $x_u$ and $y_u$ are coordinates of the pixel units with respect to a central pixel unit when the pixel units are uniformly distributed in abscissa and ordinate directions before the transformation, and $x_d$ and $y_d$ are coordinates of the pixel units respect to the central pixel unit in the abscissa and ordinate directions after the transformation, and k is a negative distortion factor, wherein the distortion factor is a measure of image distortion, which is independent from an image magnification but is dependent on an optical structure of the display device, i.e., on a focal length of the lens, thus the value of k may be determined according to the focal length of the lens. For example, the smaller the focal length of the lens is, the greater the value of k is. It is also understood that whether the value of k is positive or negative may be determined by the type of the lens. For example, when the lens is a convex lens, the value of k is a negative number. In this case, the M*N pixel units may be arranged in the barrel form according to the above formula (1). When the lens is the concave lens, the value of k is a positive number. In this case, the M*N pixel units may be formed into the pillow-like arrangement by the above formula (1). For the sake of convenient discussion, the disclosure will be described taking the convex lens as an example. It should be noted that the disclosure is described taking the convex lens as an example which is only to facilitate understanding thereof for those skilled in the art, and should not be taken as a specific limitation to the disclosure.

In addition, the $x_u$ and $y_u$ coordinates of the pixel units with respect to the central pixel unit when the pixel units are uniformly distributed in the abscissa and ordinate directions may be understood as follows: the embodiment of the disclosure is an improvement to a pixel distribution configuration of a pixel array on the conventional display panel. All the pixel units in the pixel array of the conventional display panel are uniformly distributed on the display panel, that is, the pixel units are equidistantly arranged in a straight line in the abscissa direction and equidistantly arranged in a straight line in the ordinate direction. Therefore, the above $x_u$ and $y_u$ may be understood as the coordinates of the pixel unit on the conventional display panel with respect to the central pixel unit in the abscissa and ordinate directions, and the above $x_d$ and $y_d$ may be understood as the coordinates of the pixel unit on the display panel of the disclosure with respect to the central pixel unit in the abscissa and ordinate directions. The above central pixel unit may be understood as a pixel unit located in the center of the display panel.

To facilitate those skilled in the art to understand the characteristics of the disclosure, the improvement to the pixel configuration of the display panel will be described below with reference to FIGS. 4(a) and 4(b).

Figure 4:
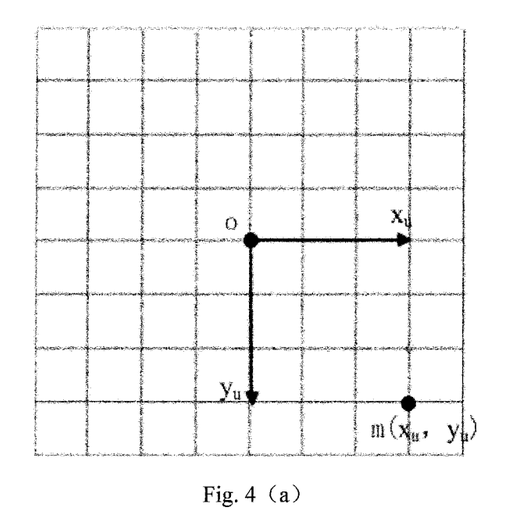
FIG. 4(a) is a schematic view of coordinates of pixel units when pixel units are uniformly distributed.
FIG. 4(b) is a schematic view of coordinates of the pixel units in the pixel array according to an embodiment of the disclosure.

For example, FIG. 4(a) is a schematic view of coordinates of pixel units when the pixel units are uniformly distributed, and FIG. 4(b) is a schematic view of coordinates of the pixel units in the pixel array according to an embodiment of the disclosure. In FIG. 4(a), the point o represents the central pixel unit, the coordinate of the pixel unit m with respect to the central pixel unit o is ($x_u$, $y_u$), and in FIG. 4(b), the point p represents the central pixel unit. The coordinate of the pixel unit m in FIG. 4(a) is converted into the coordinate of the pixel unit n in FIG. 4(b) after the pixel units are transformed into the coordinate (i) of the pixel unit n in FIG. 4(b), i.e., ($x_d$, $y_d$) according to the above formula (1). In this way, it is possible to obtain a position of the improved coordinate of each pixel unit through the above formula (1) and then to arrange a corresponding pixel configuration on the substrate of the display panel based on such a position, thereby obtaining an improved display panel on which the M*N pixel units are arranged in the barrel or pillow-like form.

In order to further improve the effect of distortion correction, optionally, in an exemplary implementation of the embodiment of the disclosure, a pixel size of each pixel unit in the pixel array may also be transformed. As an example, the pixel size of each pixel unit may be determined by the following formula (2):

$$p_u = p_d(1+3kr_d^2) \qquad (2)$$

wherein $r_d^2 = x_d^2 + y_d^2$, $p_u$ is the pixel sizes of the transformed pixel units when the pixel units are uniformly distributed in the abscissa and ordinate directions before the transformation, $p_d$ is the pixel sizes of the pixel units after the transformation, and k is the distortion factor, and k is a distortion factor.

For ease of understanding, the formula (2) is deduced as follows.

Figure 5:
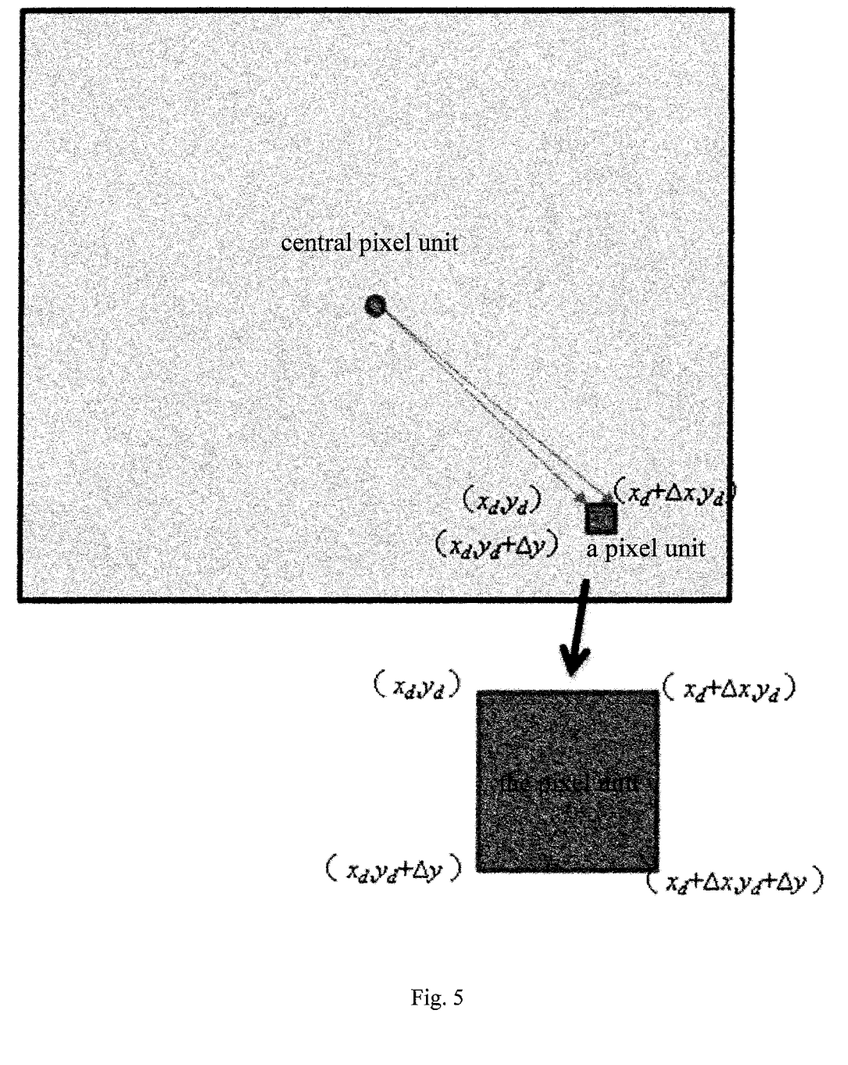
FIG. 5 is a schematic view of a coordinate of the pixel unit with respect to a central pixel unit.

For any one of the pixel units in the pixel array, since the pixel unit has a predetermined size, the coordinates of the four corners with respect to the central pixel unit may be represented as ($x_d,x_d$), ($x_d+\Delta x,y_d$), ($x_d,y_d+\Delta y$) and ($x_d+\Delta x, y_d+\Delta y$), as shown in FIG. 5.

It is known that $x_u = x_d(1+kx_d^2)$, thus $(x_u+\Delta x_u) = (x_d+\Delta x_d)(1+k(x_d+\Delta x_d)^2)$, The above formula is expanded as:

$$x_u+\Delta x_u = x_d+kx_d^3+kx_d\Delta x_d^2+2kx_d^2\Delta x_d+\Delta x_d+\Delta kx_d^2\Delta x_d+k\Delta x_d^3+2kx\Delta x_d^2$$

Since $\Delta x_u$ and $\Delta x_d$ is the size of the pixel which is much smaller than the size of a pixel array. Further, since $x_u$ and $x_d$ is a distance of the pixel unit to the central pixel unit of the pixel array, $x_u$ and $x_d$ is in the same order of magnitude as the size of the pixel array. Thus, the second-order factor and the third-order factor may be ignored. Thus, $$x_u+\Delta x_u = x_d+kx_d^3+2kx_d^2\Delta x_d+\Delta x_d+kx_d^2\Delta x_d = x_d(1+kx_d^2)+\Delta x_d(1+3kx_d^2)$$

as $x_u = x_d(1+kx_d^2)$, thus: $\Delta x_u = \Delta x_d(1+3kx_d^2)$ similarly, $\Delta y_u = \Delta y_d(1+3ky_d^2)$ Assuming that p represents the pixel size of the pixel unit, then $p_u = p_d(1+3kr_d^2)$ That is to say, according to the above formula (2), the pixel size of the pixel unit when the pixel units are uniformly distributed in the abscissa and ordinate directions (that is, the pixel size of the pixel unit of the conventional display panel) may be adjusted to the pixel size suitable for the pixel unit on the display panel of the embodiment of the disclosure.

It should be noted that the distortion factor k is related to the focal length of the lens used in the VR device. The smaller the focal length, the larger the value of k is and the more serious the image distortion is. The value of the distortion factor k may be automatically generated by the VR device after adjusting the focal length of the lens, which is not limited herein.

Therefore, in this example, the corresponding pixel will achieve a better display effect through enlarging the pixel size of the pixel unit to increase the display area, thereby further improving the effect of distortion correction.

In the display panel of the embodiment, the pixel array is disposed on the substrate of the display panel, and the pixel array includes M*N pixel units in the barrel or pillow-like arrangement. That is, the arrangement structure of the pixel units on the conventional display panel is improved, for example, the M*N pixel units are arranged in the barrel or pillow-like form. In this way, it is possible to avoid image distortion caused by the VR optical design when the improved display panel is mounted onto the VR device. For example, it is possible to eliminate the pillow-like distortion of the image when passing through the convex lens or the barrel distortion of the image when passing through the concave lens so as to correct the image distortion in real time without increasing the power consumption and the cost, thereby improving the image quality and user experience.

Figure 6:
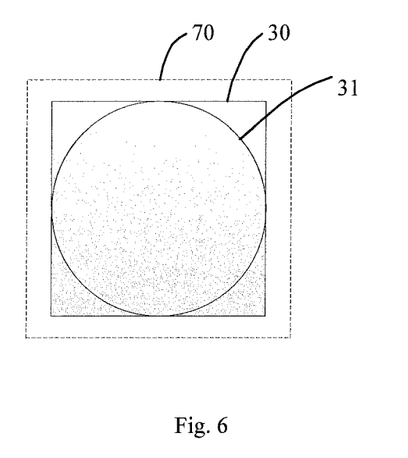
FIG. 6 is a top view of a display device according to an embodiment of the disclosure.

In order to implement the above embodiments, the disclosure further provides a display device. FIG. 6 is a top view of a display device according to an embodiment of the disclosure.

As shown in FIG. 6, the display device 70 comprises the display panel 30 as described in the above embodiments and a lens 31 disposed on the display panel 30.

In this embodiment, an arrangement of pixel units on the conventional display panel may be changed to obtain the display panel 30 of the disclosure according to the following formula (1). That is, coordinates of each of pixel units which are uniformly distributed are transformed to obtain an arrangement of pixel units in the pixel array 302 as shown in FIG. 3 so that the pixel array is arranged in a barrel form or a pillow-like form based on different types of lenses:

$$x_u = x_d(1+kx_d^2)$$

$$y_u = y_d(1+ky_d^2) \quad (1)$$

wherein $x_u$ and $y_u$ are coordinates of the pixel units with respect to a central pixel unit when the pixel units are uniformly distributed in abscissa and ordinate directions before the transformation, and $x_d$ and $y_d$ are coordinates of the pixel units respect to the central pixel unit in the abscissa and ordinate directions after the transformation, and k is a negative distortion factor which may be determined by the focal length of the lens. For example, the smaller the focal length of the lens, the greater the value of k.

Note that, the arrangements of pixel units in the pixel array on the display panel of the embodiment of the disclosure may be different from each other due to different types of the lens.

As an example, when the lens is a convex lens, the M*N pixel units on the display panel may be in a barrel arrangement, i.e., the M*N pixel units are arranged in a barrel form. The barrel arrangement may be understood that pixel units in the pixel array 302 are bulged from a center to a periphery of the pixel array so that the pixel array composed of the M*N pixel units is in the barrel form. Generally, a normal image would be pillow-like distorted after passing through a convex lens, and the pillow-like distorted image is depressed from the periphery to the center of the pixel array, as shown in FIG. 1. In order to counteract the pillow-like distortion of the image passing through the convex lens, the M*N pixel units are arranged in the barrel form (which may be understood as an inverse distortion of the pillow-like distortion). In this way, with the convex lens being disposed on the improved display panel 30, it is possible to eliminate the pillow-like distortion of the image when passing through the convex lens, so that the image after passing through the convex lens is normally displayed, thereby reducing the influence of the convex lens on the image. For the sake of easy understanding, FIG. 3 is an exemplary structural view of the display panel 30 taking the convex lens as an example.

As another example, when the lens is a concave lens, the M*N pixel units on the display panel may be in a pillow-like arrangement, i.e., the M*N pixel units are arranged in a pillow-like form. The pillow-like arrangement may be understood that pixel units in the pixel array 302 is depressed from the periphery to the center of the pixel array so that the pixel array composed of the M*N pixel units is in the pillow-like form. Generally, the normal image would be barrel distorted after passing through a concave lens, and the barrel distorted image is bulged from the periphery to the center. In order to counteract the barrel distortion of the image passing through the concave lens, the M*N pixel units are arranged in the pillow-like form (which may be understood as an inverse distortion of the barrel distortion). In this way, with the concave lens being disposed on the improved display panel, it is possible to eliminate the barrel distortion of the image when passing through the concave lens, so that the image after passing through the concave lens is normally displayed, thereby reducing the influence of the concave lens on the image.

It is also noted that the value of k may be positive or negative. Further, whether the value of k is positive or negative may be determined by the type of the lens. For example, when the lens is the convex lens, the value of k is a negative number. In this case, the M*N pixel units may be arranged in the barrel form according to the above formula (1). When the lens is the concave lens, the value of k is positive. In this case, the M*N pixel units may be arranged in the pillow-like form according to the above formula (1).

In the display device of the embodiment, the arrangement structure of the pixel units on the display panel is improved so that the M*N pixel units are arranged in the barrel or pillow-like form. In this way, it is possible to avoid image distortion caused by the VR optical design when the improved display panel is mounted onto the VR device. For example, it is possible to eliminate the pillow-like distortion of the image when passing through the convex lens or the barrel distortion of the image when passing through the concave lens so as to correct the image distortion without increasing the power consumption and the cost, thereby improving the image quality and user experience.

Figure 7:
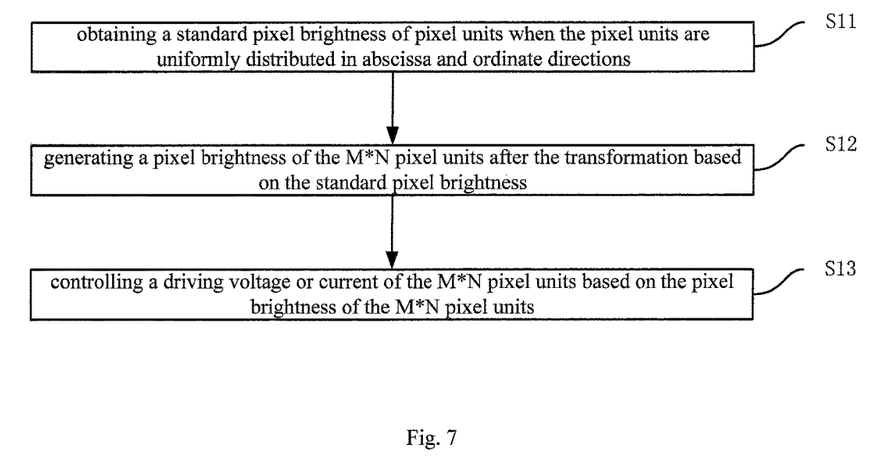
FIG. 7 is a schematic view of a flow chart of a method for driving a display panel according to an embodiment of the disclosure.

In order to realize the above embodiments, the disclosure further provides a method for driving a display panel which is the display panel 30 as described in the above embodiments to obtain an image which is not distorted and has high definition by driving the display panel 30 according to the embodiments of the disclosure. FIG. 7 is a schematic view of a flow chart of a method for driving a display panel according to an embodiment of the disclosure.

As shown in FIG. 7, the method for driving the display panel comprises steps of:

S11: obtaining a standard pixel brightness of pixel units when the pixel units are uniformly distributed in abscissa and ordinate directions, wherein the standard pixel brightness is a pixel brightness of the pixel units when the pixel units are uniformly distributed in the pixel array, i.e., a pixel brightness of pixel units before the pixel units are transformed into the pixel array 302 in the display panel 30.

S12: generating a pixel brightness of the M*N pixel units after the transformation based on the standard pixel brightness.

In this embodiment, after the standard pixel brightness is obtained, it is further possible to generate the pixel brightness of the M*N pixel units in the pixel array 302 based on the standard pixel brightness.

Alternatively, in an implementation of the embodiment of the disclosure, the pixel brightness of the M*N pixel units in the pixel array 302 may be calculated according to the formula (3) below:

$$L_u = L_d(1+3kr_d^2)^2 \quad (3)$$

wherein $r_d^2 = x_d^2 + y_d^2$, $x_d$ and $y_d$ are coordinates of the pixel units with respect to the central pixel unit in the abscissa and ordinate directions before the transformation, $L_u$ is the standard pixel brightness of the pixel units before the transformation, $L_d$ is the pixel brightness of the pixel units after the transformation, and k is the distortion factor.

For ease of understanding, the formula (3) is deduced as follows.

As known from the above description, $p_u=p_d(1+3kr_d^2)$, assuming that a pixel light transmission area of the pixel unit is represented by S, then $S_u p_u^2=p_d^2(1+3kr_d^2)^2=S_d(1+3kr_d^2)^2$.

Since the pixel brightness of the pixel unit is proportional to the pixel light transmission area, assuming that L represents the pixel brightness, then $L_u=L_d(1+3kr_d^2)^2$.

It should be noted that the distortion factor k is related to the focal length of the lens used in the VR device. The smaller the focal length, the larger the value of k is and the more serious the image distortion is. The value of the distortion factor k may be automatically generated by the VR device after adjusting the focal length of the lens, which is not limited herein.

S13: controlling a driving voltage or current of the M*N pixel units based on the pixel brightness of the M*N pixel units.

That is, the desired pixel brightness of each pixel unit on the display panel of the embodiment of the disclosure may be calculated according to the above formula (3), and the driving voltage or current of each pixel unit is adjusted according to the desired pixel brightness of each pixel unit so that the pixel brightness reached by each pixel unit satisfies display requirement of the display panel in the embodiments of the disclosure. Therefore, it is possible to further improve the display effect of the pixel by adjusting the driving voltage or current so as to increase the pixel brightness of the pixel unit, thereby improving the image quality.

In the method for driving the display panel according to the embodiment of the disclosure, the standard pixel brightness of the pixel unit when the pixel units are uniformly distributed in the abscissa and ordinate directions is obtained, and the pixel brightness of each pixel unit in the pixel array of the display panel is generated based on the standard pixel brightness, and the driving voltage or current of each pixel unit is controlled based on the pixel brightness so that the pixel brightness reached by each pixel unit satisfies the display requirement of the display panel in the embodiment of the disclosure. That is, the pixel configuration on the display panel is improved, and the pixel brightness of the pixel unit on the improved display panel is thus also modified to further improve the display effect of the pixel, thereby improving the image quality.

Any process or step described in flowcharts or otherwise described herein may be understood as one or more modules, segments or portions of code that include one or more executable instructions for implementing steps of a custom logic function or process, and the scope of the embodiments of the disclosure includes additional implementations in which functions may not be performed in the order as shown or discussed, including the functions are performed in a substantially simultaneous or reverse order, depending on the involved functions, which should be understood by those skilled in the art.

Logic and/or steps represented in the flowcharts or otherwise described herein for example may be considered as a sequencing listing of executable instructions for implementing the logic functions, which may be embodied in any computer-readable medium for use by an instruction execution system, an apparatus, or a device (such as a computer-based system, a processor-included system, or other system which acquires instructions from the instruction execution system, the apparatus, or the device and executes the instructions) or for use in connection with the same. For the purposes of this specification, a "computer-readable medium" may be any apparatus which may contain, store, communicate, propagate, or transport the program for use by or in connection with the instruction execution system, the apparatus, or the device. More specific examples (not a non-exhaustive list) of the computer-readable media include electrical connection portions (electronic devices) having one or more wires, portable computer disk cartridge (a magnetic device), random access memory (RAM), read only memory (ROM), erasable programmable read only memory (EPROM or flash memory), optical fiber devices, and portable disc read only memory (CDROM). In addition, the computer-readable medium may even be paper or other suitable medium upon which the program may be printed because it is possible to for example optically scan the paper or the other medium and then to edit, interpret or process in other suitable method as described to electronically obtain the program, which is then stored in a computer memory.

It should be understood that portions of the disclosure may be implemented in hardware, software, firmware, or a combination thereof. In the above embodiments, several steps or methods may be implemented by the software or firmware stored in memory and executed by a suitable instruction execution system. For example, if implemented in the hardware, likewise in another embodiment, it may be implemented using any one or a combination of the following techniques well known in the art: a discrete logic circuit having logic gates for implementing logic functions to data signals, an application specific integrated circuit having suitable combinational logic gates, a programmable gate array (PGA), a field programmable gate array (FPGA) and the like.

Those ordinary skilled in the art may understand that all or part of the steps of the method in the above embodiments may be implemented by a program instructing relevant hardware. The program may be stored in the computer-readable storage medium and including one or a combination of the steps of the method embodiments when being performed.

In addition, various functional units in each embodiment of the disclosure may be integrated in one processing module, or each of the units may exist separately and physically, and two or more units may be integrated in one module. The above integrated module may be implemented in the form of hardware or in the form of software functional module. When the integrated module is implemented in the form of a software function module and is sold or used as an independent product, the integrated module may also be stored in the computer-readable storage medium.

The above storage medium may be a read only memory, a magnetic disk, an optical disk or the like. Although the embodiments of the disclosure have been shown and described above, it should be understood that the above embodiments are merely exemplary and should not be construed as limiting the disclosure. The change, modification, replacement or alternation to the embodiments may be made by those ordinary skilled in the art within the scope of the disclosure.

What is claimed is:

1. A display panel, comprising:
   a substrate; and
   a pixel array disposed on the substrate and comprising M*N pixel units, wherein the M*N pixel units are in a barrel or a pillow-like arrangement, and wherein M and N are positive integers, wherein M*N pixel units uniformly distributed in the abscissa and ordinate directions form the M*N pixel units in the barrel or pillow-like arrangement through a transformation according to following formula:

$$x_u = x_d(1+kx_d^2)$$

$$y_u = y_d(1+ky_d^2),$$

wherein $x_u$ and $y_u$ are coordinates of the pixel units with respect to a central pixel unit when the pixel units are uniformly distributed in abscissa and ordinate directions before the transformation, $x_d$ and $y_d$ are coordinates of the pixel units with respect to the central pixel unit in the abscissa and ordinate directions after the transformation, which pixel units are in the barrel or pillow-like arrangement, and k is a distortion factor.

2. The display panel according to claim 1, wherein pixel sizes of the plurality of pixel units after the transformation are determined by the following formula:

$$p_u = p_d(1+3kr_d^2),$$

wherein $r_d^2 = x_d^2 + y_d^2$, $p_u$ is the pixel sizes of the pixel units when the pixel units are uniformly distributed in the abscissa and ordinate directions before the transformation, $p_d$ is the pixel sizes of the pixel units after the transformation, and k is the distortion factor.

3. A display device comprising:
the display panel according to claim 1; and
a lens disposed on the display panel.

4. The display device according to claim 3, wherein the lens is a convex lens, and the M*N pixel units on the display panel are in the barrel arrangement.

5. The display device according to claim 3, wherein the lens is a concave lens, and the M*N pixel units on the display panel are arranged in the pillow-like arrangement.

6. The display device according to claim 3, wherein the distortion factor k is determined based on a focal length of the lens.

7. A method for driving the display panel according to claim 1, wherein M*N pixel units uniformly distributed in the abscissa and ordinate directions may form the M*N pixel units in the barrel or pillow-like arrangement through a transformation, the method comprising steps of:

obtaining a standard pixel brightness of the pixel units when the pixel units are uniformly distributed in abscissa and ordinate directions before the transformation;

generating a pixel brightness of the M*N pixel units based on the standard pixel brightness after the transformation; and controlling a driving voltage or current of the M*N pixel units based on the pixel brightness of the pixel units after the transformation, wherein the standard pixel brightness is a pixel brightness of the pixel units when the pixel units are uniformly distributed in the pixel array.

8. The method according to claim 7, wherein the pixel brightness of the M*N pixel units after the transformation is generated by the following formula:

$$L_u = L_d(1+3kr_d^2)^2,$$

wherein $r_d^2 = x_d^2 + y_d^2$, $x_d$ and $y_d$ are coordinates of the pixel units with respect to the central pixel unit in the abscissa and ordinate directions before the transformation, $L_u$ is the standard pixel brightness of the pixel units before the transformation, $L_d$ is the pixel brightness of the pixel units after the transformation, and k is the distortion factor.

9. A display device, comprising:
the display panel according to claim 1; and
a lens disposed on the display panel.

10. A display device, comprising:
the display panel according to claim 2; and
a lens disposed on the display panel.

11. The display panel according to claim 1, wherein the M*N pixel units are configured such that the projections of the pixel units through a lens are uniformly distributed.

* * * * *